Jan. 3, 1950     G. H. BAKER ET AL     2,492,951
ANTENNA SYSTEM
Filed June 13, 1946     2 Sheets-Sheet 1
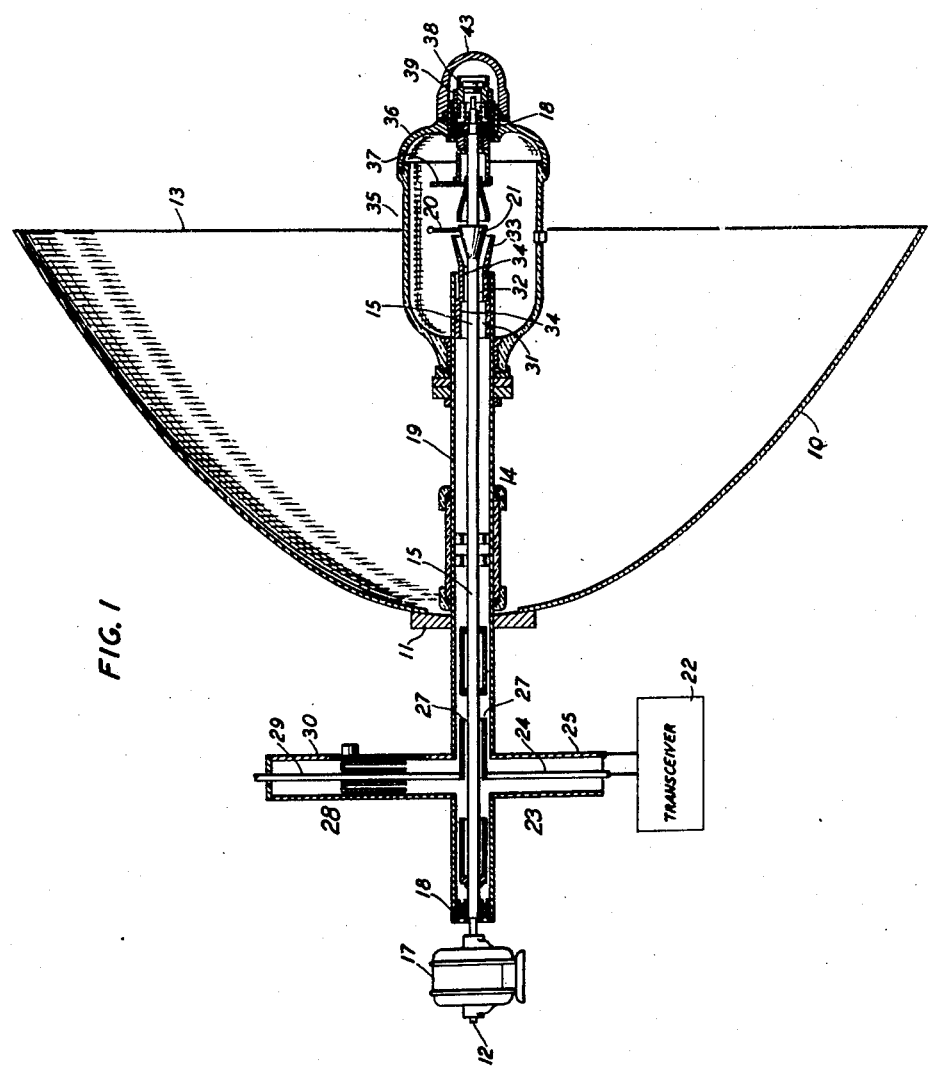
FIG. I
INVENTORS: G. H. BAKER
E. E. CRUMP
BY
ATTORNEY

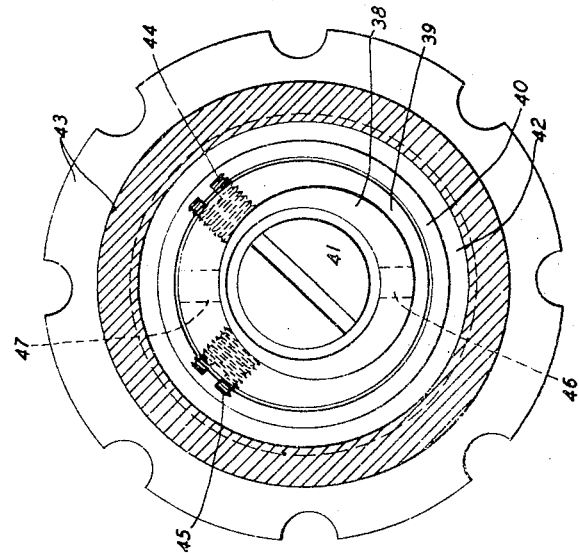
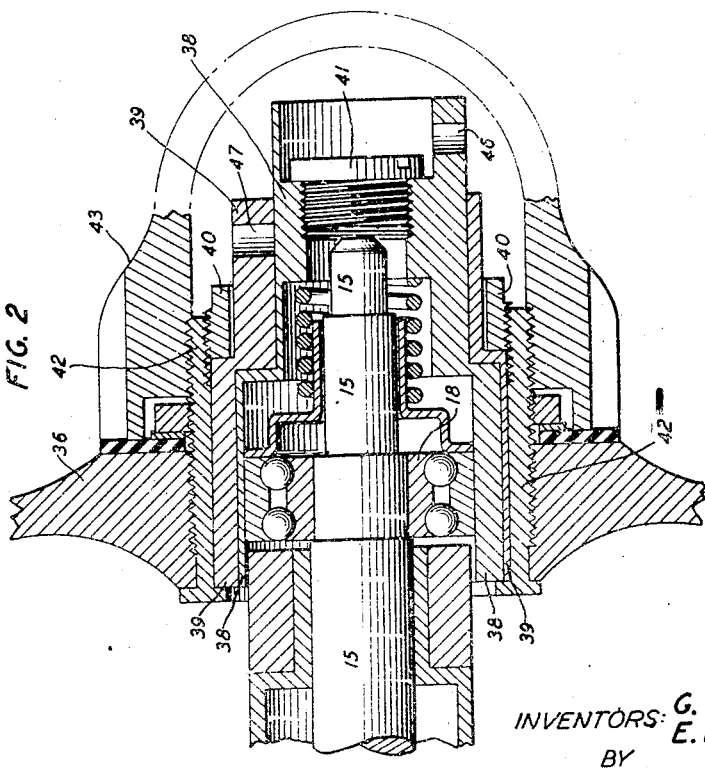

Patented Jan. 3, 1950

2,492,951

UNITED STATES PATENT OFFICE 2,492,951

ANTENNA SYSTEM

George H. Baker and Elmo E. Crump, East Orange, N. J., assignors to Bell Telephone Laboratories, Incorporated, New York, N. Y., a corporation of New York Application June 13, 1946, Serial No. 676,393

4 Claims. (Cl. 250—33.65)

This invention relates to transmission systems and to antenna apparatus designed to operate therewith. It is more particularly related to means for eliminating, in directive radio systems, false direction indications.

As is known, because of the fineness of resolution required in radar or reflection type target locating systems, it is customary to employ decimetric or centimetric radio waves and a highly directive antenna system. The magnetron oscillators ordinarily utilized for generating the aforementioned waves are often affected by impedance changes in the attached load and, when the variation in the load impedance is of sufficient magnitude, the power output or the frequency of oscillation of the magnetron oscillator will be changed. A shift in oscillating frequency does not greatly affect the transmitting operation, but when the reflected energy of shifted frequency is applied to the sharply tuned receiving circuit, it is subjected to frequency discrimination due to the filter action in the heterodyne type receiver which action introduces directional errors. It is of course highly desirable to eliminate all causes producing the above-mentioned, and other, directional errors.

Also, because of the fineness of resolution usually required in such systems, various arrangements have been employed to sharpen their direction indicating properties. Since direction is often determined by pointing a beam, or a directive lobe, at the object to be located and since in many practicable systems as, for example, a system comprising a loop antenna, the peak or nose of the lobe is fairly blunt or broad, it is necessary for accurate determination of the "bearing" or direction of a reflective target, to move or wobble the blunt loke peak across the target for the purpose of determining the two angular positions or directions of the lobe axis at which the intensities of the successively received reflected waves are equal and smaller than the maximum intensity of the received reflected wave. The point or angular direction equidistant from the two above-mentioned angular directions coincides, approximately, with the actual target direction.

In order to determine more accurately the direction of the incoming wave, single-plane lobe-switching, dual-plane lobe-switching and so-called conical scanning systems have been proposed. As is known, in the lobe switching and conical scanning systems, the side or slope, rather than the peak or nose, of the lobe, is utilized in ascertaining the target direction. Along the slope, the intensity of the received or echo wave varies rapidly with small changes in the angular direction of the incoming wave whereas, as discussed above, along the top or nose of the lobe it varies slowly with the angular changes.

In more detail, in the conical scanning system, the longitudinal axis of the lobe is displaced by a known angular amount from the longitudinal axis of a parabolic reflector and is rotated about this latter axis. This rotation of the lobe axis generates in space a cone having its axis coincident with the reflector axis, the lobe having a so-called equi-intensity point on one of its slopes coinciding with this axis of rotation. When, with this system, the reflecting target is on the longitudinal axis of the reflector, the point of intersection of the target direction and the slope of the lobe remain fixed, and the received reflected energy will not vary, as the lobe rotates. However, if the object is a fraction of a degree or more from this axis, the intersecting point moves along the lobe slope and the amplitude of the reflected signal will vary, increasing as the rotating lobe axis approaches the target direction and decreasing as it swings to the opposite side of the axis. This produces an amplitude modulation of the reflected signal, the amplitude of which gives some indication of the amount of displacement and the phase of which is an index of the direction in which the longitudinal axis must be moved to bring it into alignment with the reflecting target. To facilitate determination of the phase of this modulation, a small two-phase sinusoidal generator is driven in synchronism with the rotation of the beam and the voltages derived from the generator are used as phase reference standards. Visual indication of the target's location with respect to the axis of the reflector is obtained from a presentation of the "pip" or spot of reflected energy on a cathode-ray tube screen. It is obvious that any factor other than a reflecting object that causes amplitude modulation will cause such a system to give a false direction indication.

The copending application of Phillip H. Smith, Serial No. 498,622, filed August 14, 1943, discloses one type of conical scanning system such as described above. In this system a semidipole radiating antenna is rotated in ront of a paraboloidal reflector. Experience therewith has demonstrated that sufficient variation occasionally occurs in the antenna load impedance as it is rotated to cause the magnetron oscillator to correspondingly change its frequency or power output. As previously stated, this change in oscillating frequency results in frequency modulation in the transmitted and reflected signals which modulation is changed to amplitude modulation in the received signal by the frequency discrimination of the filter circuits of the receiver. This action when combined with a signal reflected by a target results in a false direction indication of the target.

In addition to frequency excursions, the cyclic variations in the antenna load impedance give rise to cyclic variations in the energy output. These power variations are indistinguishable in the receiving equipment from the amplitude modulation caused by the location of the target with respect to the reference axis and accordingly contribute an erroneous component to the indicated location.

It is accordingly one of the objects of this invention to control the variation in the impedance of a load which forms a portion of an electrical system comprising a source and a connected load, the impedance of which would vary if it were not controlled.

It is another object of the invention to reduce to a minimum the impedance variations in an antenna system employing an antenna element in moving relationship with adjacent surfaces.

The above objects are accomplished through the use of simple, inexpensive, adjustable means which may be readjusted to compensate for changed operating conditions if circumstances indicate the desirability of so doing.

The manner in which the invention accomplishes these objects and the various features attendant thereupon may be more clearly appreciated when it is considered in connection with one preferred embodiment as shown in the attached drawing in which:

Fig. 1 shows a longitudinal cross-section of a directive antenna system embodying one aspect of the invention;

Fig. 2 shows in detail a longitudinal cross-section of the support bearing for the outer end of the antenna line of Fig. 1; and Fig. 3 shows a cross-sectional end view of the shaft support of Fig. 2.

Experience has indicated that the variations in the load impedance arise from one or more origins. One of these is in the mechanical irregularities produced in manufacturing processes which irregularities are within the best practicable manufacturing tolerances. Another is in variations permissible in the assembling and mounting processes of a complete structure. A third arises from the necessarily unsymmetrical arrangement of unrelated surfaces in effective close proximity to the apparatus. Variations arising from these and possibly other sources are virtually eliminated through the use of this invention.

Referring to Fig. 1, reference numeral 10 denotes a paraboloidal reflector or secondary antenna having a vertex 11, a principal axis 12 and a focal plane 13. Numeral 14 denotes a coaxial line comprising an inner rotatable conductor 15 and a stationary outer conductor 19. The inner conductor 15 extends through vertex 11 and is aligned with axis 12, and it constitutes a shaft driven by a motor 17 and supported at each end by bearings 18. A quarter-wave primary antenna element 20 is located in the focal plane 13 of the reflector unit 10 and has its axis substantially perpendicular to the axis 12 of the reflector unit and to the axis of the inner rotating conductor 15. The antenna 20 is connected to the rotating shaft 15 through a solid conical metallic member 21 which is integral with shaft 15 and which is located at or near the focal point of the reflector unit 10. The coaxial line 14 is connected to a translation device 22, such as a radar transceiver, through a main coaxial line 23 comprising an inner conductor 24 and an outer conductor 25. The outer conductors 19 and 25 of lines 14 and 23 are directly connected and the inner conductors 15 and 24 of these lines are coupled through a quarter wave coupling. This coupling comprises a quarter wave sleeve 27 and a corresponding tubular portion of the shaft 15 as viewed from either end of the line. The capacity between the surface of the inner conductor 15 and the inner surface of the sleeve 27 is exceedingly large since the structure is a quarter wavelength long and therefore the impedance between these two surfaces approaches zero. The inner conductor 24 of the main coaxial line 23 is connected to the sleeve member 27 and therefore to the rotating shaft 15 through the extremely low impedance existing between the sleeve 27 and the shaft 15. A coaxial line 28 comprising an inner conductor 29 and an outer conductor 30 forms a coaxial tuning stub and is connected to line 14 at a point opposite line 23. The impedance of the primary antenna 20 is matched to that of the line 14 through a pair of serially connected quarter wave impedance transformers 31 and 32. Transformers 31 and 32 comprise the inner surfaces of quarter wavelength tubular conductors 34 and 34', respectively, and corresponding portions of the rotating shaft or inner conductor 15. The flared quarter wave tubular conductor 33 constitutes what is commonly called a venturi. Numeral 37 designates a reflecting antenna which rotates in unison with the semidipole 20 and which has for its purpose the reflection of electromagnetic waves from the semidipole antenna 20 to the paraboloidal reflector 10. This reflecting antenna 37, the primary antenna 20 and the Venturi structure 33 are in a Plexiglas housing 35 which is attached to the coaxial line 14 and functions as a support for the bearing housing 36 and end cap 43.

As shown in greater detail in Figs. 2 and 3 the bearing housing 36 and end cap 43 support and enclose the coaxial inner rotating conductor 15. The inner conductor 15 is supported by and rotates with the inner row of the ball type bearing 18 which is mounted inside of a double eccentric comprising units 38 and 39. These inner and outer eccentric units 38 and 39 are enclosed in the cylindrical unit 42 and held in place by the locking nut or locking ring 40. Numeral 41 designates a cap screw fitting into a threaded receptacle inside of the inner eccentric unit 38 and encloses the end of the rotating inner conductor 15. Eccentrics 38 and 39 contain the slots or recesses 46 and 47, respectively, which are designed to receive the tool used in positioning one eccentric with respect to the other. As shown in Fig. 3, the outer eccentric 39 contains the locking set screws 44 and 45 for locking in position the inner eccentric 38 in any desired relation to the outer eccentric 39.

In considering the operation of this embodiment of the invention, reference should be made to our copending application Serial No. 676,616, filed June 14, 1946, which sets forth in detail the method of measuring the variation in the load impedance of the antenna unit 20 and the determination of the proper correction therefor.

As previously discussed, the frequency modulation imparted to the transmitted wave may, in the filter circuits incorporated in the translation device 22, become converted to amplitude modulation and result in shifting of the spot which denotes the reflecting object's location as seen on a cathode-ray tube screen (not shown) incorporated in the radar transceiver device 22. Because of structural irregularities, the quarter wave antenna 20 and the rotating inner conductor 15 do not maintain a symmetrical disposition with respect to all nearby objects and surfaces as the antenna is rotated about the axis of the reflector unit 10. As seen from the magnetron oscillator unit included in the radar transceiver device 22, any variation in the impedance of the antenna unit appears as a varying load on its output. It has been determined that the primary sources of impedance variation arise through proximity variations between the inner rotating conductor 15 and the inner surface of the outer conductor 19 of the coaxial line 14, between the inner conductor 15 and the quarter wave elements 34 and 34' of the transformers 31 and 32, between the outer surface of the conical member 21 and the inner surface of the Venturi member 33, between the quarter wave antenna element 20 and the lip or outer edge of the Venturi member 33, all of which occur as the quarter wave antenna element 20 is rotated about the reflector axis 12. In addition to the foregoing, variations in the impedance of the quarter wave antenna 20 occur as this antenna rotates and changes its proximity to nearby objects such, for example, as deck structures, masts, rigging or gun mounting on ships. Variations of this latter character are more or less continuously changing, but through the use of this invention they may be counterbalanced for a given position of the antenna system. These latter variations are minor and do not materially affect the oscillator operation. Variations of the former class are more or less permanent in their nature and arise from lack of symmetry between the surfaces of the antenna system. This lack of symmetry results in a variation in the load impedance as the antenna element rotates; and this variation alternately or cyclically loads the magnetron oscillator to a greater or lesser degree and results in cyclic frequency or power variations in the oscillator output. The frequency variations are equivalent to cyclic frequency modulations of the transmitted microwaves, at the antenna rotating frequency, and when reflected energy so modulated is received with the normally amplitude modulated reflected energy from a target, it will be converted to amplitude modulated components in the receiving unit and will cause an error in the indicated location of the target. As previously stated, the cyclic power output variations are indistinguishable in the receiving apparatus from amplitude modulations imparted by the target.

The effect of this lack of symmetry during the rotational cycle may be minimized or eliminated by dynamically adjusting the antenna system impedance through the use of the inner and outer eccentrics 38 and 39 of Figs. 2 and 3. This adjustment is accomplished by manually rotating the inner or outer eccentrics 38 and 39, or both, in a manner such as to shift the bearing 18 supporting the outer end of the rotating inner conductor 15, and therefore such as to shift the axis of rotation of this conductor and the associated antenna element 20 to a position where the eccentrics maintain substantial symmetry with respect to the adjacent surfaces during the rotational cycles.

The determination that variations in the impedance matching do occur during the rotational cycle and the determination of the magnitude and phase of the correction to be applied through the use of the inner and outer eccentrics 38 and 39 may be made through the use of suitable testing and indicating apparatus. Our copending application mentioned above fully discloses one type of testing and indicating apparatus and the method of its use which we have found to be satisfactory for this purpose.

In general this apparatus provides suitable means for selecting the portion of the transmitted energy that is reflected from the point of the impedance mismatch back toward the transmitting source. The amplitude of this reflected energy will vary as the impedance mismatch varies in its cyclic mode, which variation may be detected as amplitude modulation. Through the use of limiting and phase inversion means, this amplitude modulation component is utilized in a phase and amplitude sensitive circuit along with the voltages derived from a small two-phase generator that is rotated in synchronism with the antenna element 20 to give on the screen of a cathode-ray tube a visual indication of the variations in the impedance mismatch as the antenna element is rotated. Observations of this visual indication are used to direct the positioning of the eccentrics 38 and 39 to eliminate or minimize these variations. After suitable adjustment of the double eccentric has been made the inner eccentric 38 is permanently positioned inside of the outer eccentric 39 by the locking set screws 44 and 45 of Fig. 3. The outer eccentric 39 is maintained in its position by tightening the locking ring 40 in its threaded position in the cylindrical unit 42 as shown on Figs. 2 and 3. The antenna end cap 43 forms a weather-tight housing for the entire assembly.

As previously stated the antenna impedance also tends to vary because of unsymmetrical proximity with adjacent non-related structures during the rotational cycle. For any one particular position of the antenna system at the time of the foregoing adjustments these variations are compensated. When the antenna system is changed from the position it occupied during the adjustment period, these latter factors will again be uncompensated. However, their effect is in general so small as to be negligible.

Although the invention has been described in connection with a specific embodiment, it is not to be limited thereto inasmuch as other apparatus may be utilized in successfully practicing the invention.

What is claimed is:

1. In a radio system comprising a source of electric energy, an antenna element, a line comprising an inner and outer conductor connecting said source to said antenna, said antenna being attached to said inner conductor, means attached to said antenna element for imparting rotary motion thereto, and means for reducing to a substantial minimum the impedance variation in said rotating antenna, said means comprising a double eccentric mounting at one end of said rotating inner conductor for moving the axis of rotation of said inner conductor and said antenna element with respect to adjacent surfaces.

2. In a radio system comprising a source of electric wave energy, an antenna element, a transmission line comprising an inner conductor and an outer conductor and connecting said source and said antenna, said antenna element being connected to said inner conductor at a point adjacent one end of said conductor, means connected to the other end of said inner conductor for imparting rotary motion thereto and to said antenna and a double eccentric connected to said inner conductor at said first-mentioned point for moving said inner conductor relative to said outer conductor and maintaining at a substantial minimum the impedance variation in said antenna element.

3. A transmission system comprising a source of electric energy, a coaxial transmission line connected thereto and comprising a rotatable inner conductor and a stationary outer conductor, a quarter wave antenna element rigidly attached to said inner conductor, means connected to said inner conductor for rotating said inner conductor and said element, and means attached to said rotatable inner conductor for maintaining at a substantial minimum the variations in the input impedance of said antenna element occurring during rotation of said element and said inner coaxial conductor, said means comprising a double eccentric assembly for moving the axis of rotation of said rotatable inner conductor relative to said stationary outer conductor.

4. In a transmission system comprising a source of electric energy, a transmission line connected thereto and having an inner rotatable conductor, a stationary outer conductor, and at least one impedance matching transformer included in said line, an antenna element attached to said inner rotatable conductor, means attached to said inner conductor for reducing the variations in the impedance presented to said source when said inner conductor is rotated, said means comprising a double eccentric for changing the axis of rotation of said inner conductor whereby variations in the transformation ratios of said impedance matching transformers are reduced.

GEORGE H. BAKER.
ELMO E. CRUMP.

REFERENCES CITED

The following references are of record in the file of this patent:

UNITED STATES PATENTS

| Number | Name | Date |
|---|---|---|
| 1,927,393 | Darbord | Sept. 19, 1933 |
| 2,243,426 | Kircher | May 27, 1941 |
| 2,267,143 | Soldan | Dec. 23, 1941 |
| 2,406,372 | Hansen et al. | Aug. 27, 1946 |
| 2,412,867 | Briggs et al. | Dec. 17, 1946 |